United States Patent [19]

Sunderland

[11] Patent Number: 4,661,748

[45] Date of Patent: Apr. 28, 1987

[54] POWER SUPPLY FOR DEFLECTION CIRCUIT

[75] Inventor: Richard A. Sunderland, Aloha, Oreg.

[73] Assignee: SpaceLabs, Inc., Chatsworth, Calif.

[21] Appl. No.: 669,717

[22] Filed: Nov. 9, 1984

[51] Int. Cl.[4] .............................................. H01J 29/70

[52] U.S. Cl. .................................... 315/411; 358/190

[58] Field of Search ........................ 315/411, 396, 397; 358/190

[56] References Cited

U.S. PATENT DOCUMENTS

| | | | |
|---|---|---|---|
| 3,845,352 | 10/1974 | Newman et al. | 315/397 |
| 3,887,842 | 6/1975 | Owens, Jr. et al. | 315/397 |
| 3,965,390 | 6/1975 | Spencer, Jr. | 315/397 |
| 4,266,269 | 5/1981 | Toba | 358/190 |
| 4,394,722 | 6/1983 | Nero | 358/190 |
| 4,429,260 | 1/1984 | Truskalo | 358/190 |
| 4,525,739 | 6/1985 | Fitzgerald | 315/411 |

*Primary Examiner*—Theodore M. Blum
*Assistant Examiner*—David Cain
*Attorney, Agent, or Firm*—Lawrence S. Levinson; Robert E. Lee, Jr.

[57] ABSTRACT

A power supply circuit for an output stage portion of a magnetic deflection circuit amplifier is disclosed. It comprises a power supply means for supplying a supply voltage during the collapse of the magnetic field associated with the yoke following the retrace portion. The power supply means also restores energy to another power supply means to which it is coupled, the other power supply means providing a supply voltage to the amplifier during a portion of the raster scan just preceding the retrace.

2 Claims, 4 Drawing Figures

POWER SUPPLY FOR DEFLECTION CIRCUIT

BACKGROUND OF THE INVENTION

The present invention relates to an improved power supply, more particularly, to a power supply for a magnetic deflection circuit.

With advances in low power digital circuits, the magnetic deflection circuit associated with raster display of digital systems comprises one of the highest power consuming circuits in the system. A need always exists in making the system more efficient and less power consuming. One target area for such an increase in efficiency is the power supply for the magnetic deflection circuit power amplifier. Resonant flyback techniques work quite well for reducing power consumption of raster-only deflection circuits. However, deflection circuits capable of doing either raster scan or directed beam calligraphic functions cannot take advantage of these techniques. This is because the nature of directed beam requirements are far too variable to be able to pick a single supply voltage or pair of suitable voltages for highly efficient operation under all conditions.

SUMMARY OF THE INVENTION

A power supply circuit for an output stage portion of a magnetic deflection circuit amplifier is provided. It comprises a power supply means for supplying a supply voltage during the collapse of the magnetic field associated with the yoke following the retrace portion. The power supply means also restores energy to another power supply means to which it is coupled, the other power supply means providing a supply voltage to the amplifier during a portion of the raster scan just preceding the retrace.

DETAILED DESCRIPTION OF THE DRAWINGS

Figure 1:
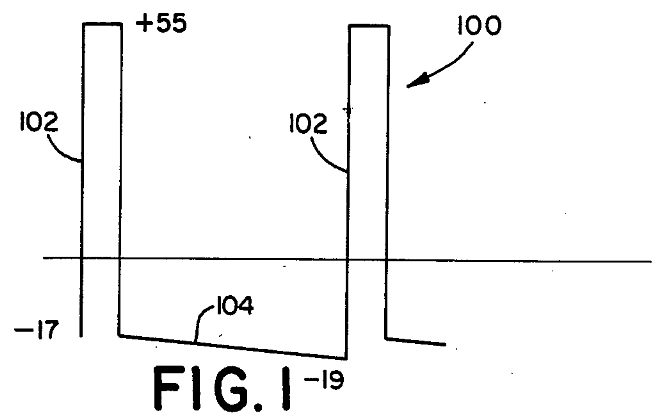
FIG. 1 shows the voltage signal of a magnetic deflection circuit during flyback and scan.

Referring now to FIG. 1, a typical output voltage signal 100 for a magnetic deflection circuit is shown having a relatively narrow positive voltage spike 102 of about 55 volts needed for the flyback portion of the raster scan. The voltage level is dependent on the desired flyback speed and the inductance of the yoke. During the scan portion the voltage varies from about −17 volts to −19 volts 104.

Figure 2:
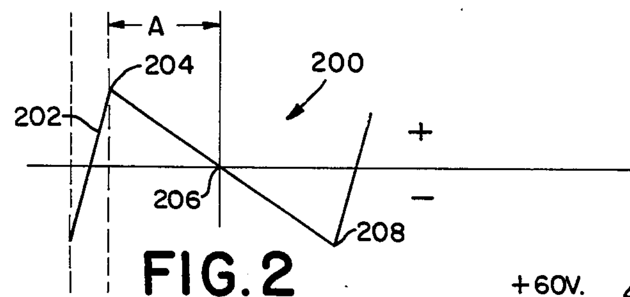
FIG. 2 shows the current signal associated with the voltage signal of FIG. 1.

FIG. 2 shows the yoke current 200 associated with the voltage of FIG. 1. The fast positive transition 202 is caused by the plus 55 volts. As the yoke magnetic field collapses from its peak positive value, the current drops from the peak 204 to zero at 206. For purposes of discussion this region of the current signal will be called Region A.

Figure 3:
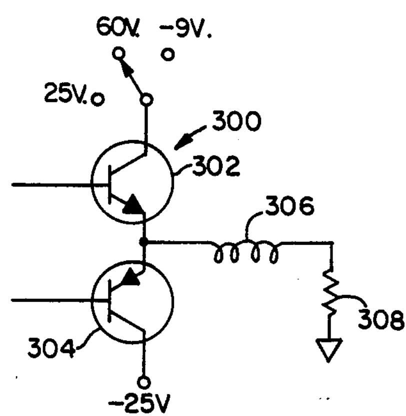
FIG. 3 is a simplified circuit diagram of a magnetic deflection circuit power amplifier output stage.

Referring to FIG. 3, the amplifier designated 300 generally which provides the output current for the yoke is shown in simplified form. It comprises an n p n emitter follower 302 and a p n p emitter follower 304 whose outputs are coupled to the load, yoke 306. For clarity transistor biasing is not shown. The yoke 306 is connected to ground through a current sensing resistor 308.

The collector of transistor 302 is supplied from a 60 volt power supply during the flyback portion 102 of the scan. During Region A, yoke current initially at the positive value 204 flows through current sensing resistor 308 to ground. This current is provided from the −9 volt supply. The collector of transistor 304 is coupled to −25 volt power supply. During the remaining part of the scan after Region A, i.e., in FIG. 2 from current at 206 to some minus value at 208, the current flow through the yoke 306 is provided by the −25 volt power supply through transistor 304.

For directed beam calligraphic use, the collector of transistor 302 in FIG. 3 would be connected to +25 volts.

Figure 4:
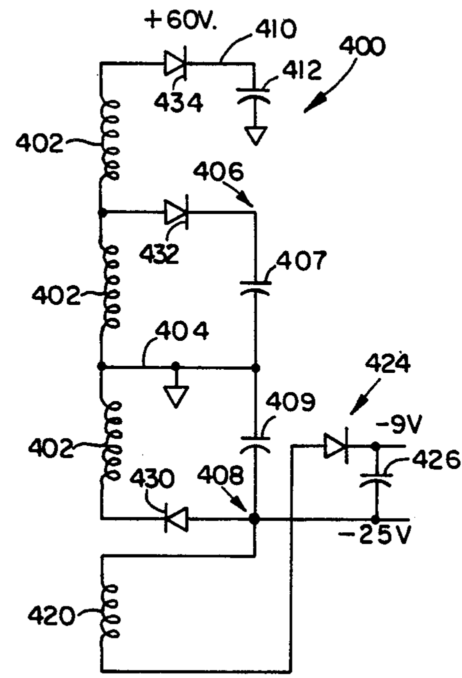
FIG. 4 is a circuit diagram of an improved power supply of the present invention for use with the circuit of FIG. 3.

FIG. 4 is a diagram of the power supply for the circuit of FIG. 3 showing the relationship between the +60, +25, −25 and −9 volt power supplies.

The power supply 400 comprises a transformer winding 402 with a grounded center tap 404 with plus and minus 25 volt outputs 406 and 408, respectively, with associated capacitor 407 and 409, respectively. Only half the necessary diode circuitry (diodes 430, 432 delete "and 434") is shown as being representative. A 60 volt output 410 connected to ground by capacitor 412 is also provided.

The power supply further comprises a floating winding 420 with one output coupled to the dc side of the minus 25 volt output 408 with the other output coupled through a diode 424 to the plus side of the delete "electrolytic" capacitor 426. The minus side of the capacitor 426 is coupled directly to the dc side of the −25 volt output 408. The voltage drop across the capacitor 426 is 16 volts resulting in the positive side of the capacitor being at −9 volts.

When current is being pulled out of the −9 volt supply during Region A, the floating winding 420 tends to preserve the 16 volts across the capacitor 426. Therefore, the −25 volt supply capacitor 409 will be driven more negative than −25 volts, that is, current is being put back into the −25 volt supply by charging the capacitor 409 up a little more in the negative direction.

During the region when the current goes negative from 206 to 208 in FIG. 2, energy is removed from the −25 volt power supply. Part of this energy is replaced during Region A of the next scan cycle because of the −9 volt circuit described above. This results in a tremendous power savings since instead of providing a 60 volt supply to transistor 302 during Region A, when the output voltage is only −17 volts, a −9 volt supply is used instead.

Although the preferred embodiment is shown with specific voltages described above the present invention is suitable for use with other voltages as well.

I claim:

1. A power supply circuit for an output stage portion of a magnetic deflection circuit amplifier having a yoke for a load and for providing a raster scan comprising:

first power supply means for providing a first power supply voltage for the retrace portion of said raster scan;

second power supply means for providing a second power supply voltage for a selected portion of said raster scan immediately preceding said retrace portion;

third power supply means coupled to said second power supply means for providing a third power supply voltage during the collapse of the magnetic field of said yoke following said retrace portion, said third power supply means providing to said second power supply means a portion of the energy removed from said second power supply means during said selected portion of said raster scan, said power supply means further comprising:

a grounded center tap transformer winding for providing said second power supply voltage from a first terminal of said winding through a first diode;

a first capacitor coupled between the center tap and the output of said first diode;

a first additional winding having one terminal coupled to the output of said first diode;

a second terminal of said first additional winding coupled through a second diode to provide an output;

a second capacitor coupled between the output of said first diode and the output of said second diode to provide said third power supply voltage; and the polarity of said third power supply voltage being such to cause the magnitude of the sum of said second and said third power supply voltages to be less than the magnitude of said second supply voltage.

2. The circuit of claim 1 wherein said power supply circuit further comprises a second additional winding coupled to said grounded center tap winding at a terminal side opposite said first terminal for supplying said first power supply voltage.

* * * * *